(12) United States Patent
Tatsuma et al.

(10) Patent No.: US 9,637,084 B2
(45) Date of Patent: May 2, 2017

(54) WEBBING TAKE-UP DEVICE (71) Applicant: KABUSHIKI KAISHA TOKAI-RIKA-DENKI-SEISAKUSHO, Aichi-Ken (JP)

(72) Inventors: Atsushi Tatsuma, Aichi-ken (JP); Takuhiro Saito, Aichi-ken (JP); Yoshimichi Kaneko, Aichi-ken (JP); Yuya Nagata, Aichi-ken (JP)

(73) Assignee: KABUSHIKI KAISHA TOKAI-RIKA-DENKI-SEISAKUSHO, Aichi-Ken (JP)

( * ) Notice: Subject to any disclaimer, the term of this patent is extended or adjusted under 35 U.S.C. 154(b) by 136 days.

(21) Appl. No.: 14/638,307

(22) Filed: Mar. 4, 2015

(65) Prior Publication Data
US 2015/0251628 A1  Sep. 10, 2015

(30) Foreign Application Priority Data

Mar. 7, 2014  (JP) .................................. 2014-045388

(51) Int. Cl.
*B60R 22/46*  (2006.01)
(52) U.S. Cl.
CPC ........ *B60R 22/46* (2013.01); *B60R 2022/468* (2013.01); *B60R 2022/4666* (2013.01)
(58) Field of Classification Search
CPC ..................... B60R 22/46; B60R 2022/468
See application file for complete search history.

(56) References Cited

U.S. PATENT DOCUMENTS

| | | | |
|---|---|---|---|
| 8,376,258 B2 * | 2/2013 | Ando ..................... | B60R 22/46 242/374 |
| 2010/0264245 A1 * | 10/2010 | Ando ..................... | B60R 22/46 242/390 |
| 2015/0251629 A1 * | 9/2015 | Tatsuma .................. | B60R 22/46 242/390.8 |

FOREIGN PATENT DOCUMENTS

| | | |
|---|---|---|
| JP | 2010-253969 A | 11/2010 |
| JP | 2011088469 A | 5/2011 |

OTHER PUBLICATIONS

Notice of reasons for Rejection issued in the corresponding Japanese application No. 2014-045388 on Jan. 10, 2017.

* cited by examiner

*Primary Examiner* — Sang Kim
(74) *Attorney, Agent, or Firm* — Roberts Mlotkowski Safran Cole & Calderon P.C.

(57) ABSTRACT

A webbing take-up device is obtained capable of restricting movement of a clutch member in the axial direction of a second gear. In the webbing take-up device, a movement prevention portion is formed, on a rotor side, at an intermediate bottom portion of a large gear portion, and a clutch spring attached to the rotor abuts the movement prevention portion, thereby preventing any movement of the clutch spring further to the intermediate bottom portion side. Movement of the clutch spring in the axial direction of the rotor can accordingly be suppressed, enabling movement of the clutch spring in the axial direction of the rotor to be restricted.

8 Claims, 4 Drawing Sheets

WEBBING TAKE-UP DEVICE

CROSS-REFERENCE TO RELATED APPLICATION

This application claims priority under 35 USC 119 from Japanese Patent Application No. 2014-045388 filed Mar. 7, 2014, the disclosure of which is incorporated by reference herein.

BACKGROUND

Field of the Invention

The present invention relates to a webbing take-up device capable of cutting off transmission of rotation force between a motor and a spool when the webbing is pulled in a driven state of the motor.

Related Art

In an overload release mechanism of a webbing take-up device described in Japanese Patent Application Laid-Open (JP-A) No. 2011-88469, since a friction spring is attached so as to be wound onto a cylindrical portion of a small diameter gear, there is a possibility that the friction spring may move along an axial direction of the cylindrical portion.

SUMMARY

In consideration of the above circumstances, a webbing take-up device capable of restricting movement of a clutch member in an axial direction of a second gear is obtained.

A webbing take-up device of a first aspect includes: a spool on which webbing is taken up; a motor that rotates the spool; a first gear that is provided on a rotation transmission route from the motor to the spool; a second gear that is provided on the rotation transmission route and that is capable of relative rotation with respect to the first gear; a clutch member that is provided at the first gear and transmits rotation between the second gear and the first gear, and that cuts off the rotation transmission by the clutch member rotating relative to the second gear; and a restriction section that is provided, along an axial direction of the second gear, between the first gear and the clutch member, and that restricts movement of the clutch member toward the first gear side.

According to the webbing take-up device of the first aspect, the restriction section is interposed along the axial direction of the second gear (along the axial direction of the first gear) between the clutch member provided at the first gear, and the first gear. Movement of the clutch member toward the first gear side is restricted by the restriction section.

A webbing take-up device of a second aspect is the webbing take-up device of the first aspect, further including a rotor including: a circular cylinder portion that is formed in a circular cylinder shape; and a corner portion that is formed at an end portion of the circular cylinder portion at a side of the first gear, the corner portion having shape such that, as seen along the axial direction of the second gear, a diameter of the corner portion is reduced compared to a diameter of the circular cylinder portion, wherein: due to the restriction section, the clutch member is wound onto the rotor at a position further toward a side of the circular cylinder portion than a position where an external diameter of the corner portion is maximum, and the rotor is fixed to the second gear.

In the webbing take-up device of the second aspect, by the restriction section, the winding position of the clutch member on the rotor, which rotor is provided so as to be incapable of relative rotation with respect to the second gear, is further toward the circular cylinder portion side than the maximum external diameter position of the corner portion of the rotor. The winding position of the clutch member is thereby prevented or suppressed from moving further toward the first gear side than the maximum external diameter position of the corner portion.

It is possible in the first aspect that the webbing take-up device further includes a rotor including: a circular cylinder portion that is formed in a circular cylinder shape; a bottom portion that is formed at an end portion of the circular cylinder portion at a side of the first gear; and a corner portion that is formed between the circular cylinder portion and the bottom portion to connect the circular cylinder portion and the bottom portion, wherein: due to the restriction section, the clutch member is wound onto the rotor at a position further toward a side of the circular cylinder portion than a position where an external diameter of the corner portion is maximum, and the rotor is fixed to the second gear.

Further, it is possible that in a state in which the restriction section and the clutch member are abutted, the clutch member is wound onto the rotor at the position further toward the side of the circular cylinder portion than the position where the external diameter of the corner portion is maximum.

A webbing take-up device of a third aspect is the webbing take-up device of the second aspect, wherein a cross-section, in a direction orthogonal to a circumferential direction of the rotor, of the clutch member has a circular profile, and a sum of a length of the restriction section in the axial direction of the second gear and a radius of the cross-section of the clutch member is set to be equal to or greater than a length from an end portion of the corner portion at a side of the circular cylinder portion to the first gear.

In the webbing take-up device of the third aspect, the sum of the length of the restriction section in the second gear axial direction and the radius dimension of the cross-section of the clutch member is set at the length from the circular cylinder portion side end portion of the corner portion of the rotor to the first gear, or longer. The winding position of the clutch member on the rotor can accordingly be set at the circular cylinder portion of the rotor.

A webbing take-up device of a fourth aspect is the webbing take-up device of any one of the first aspect to the third aspect, wherein the restriction section is integrally formed at the first gear.

As described above, the webbing take-up device according to the present invention is capable of restricting movement of the clutch member in the axial direction of the second gear.

BRIEF DESCRIPTION OF THE DRAWINGS

Exemplary embodiment will be described in detail with reference to the following figures, wherein.

DETAILED DESCRIPTION

Configuration of Present Exemplary Embodiment

Explanation follows regarding a webbing take-up device 10 according to an exemplary embodiment, with reference to FIG. 1 to FIG. 4. In each of the drawings, the arrow FR indicates the front side in the front-rear direction of the webbing take-up device 10, the arrow LH indicates the left side in the left-right direction of the webbing take-up device 10, and the arrow UP indicates the upper side in the up-down direction of the webbing take-up device 10.

Overall Configuration of Webbing Take-Up Device 10

Figure 1:
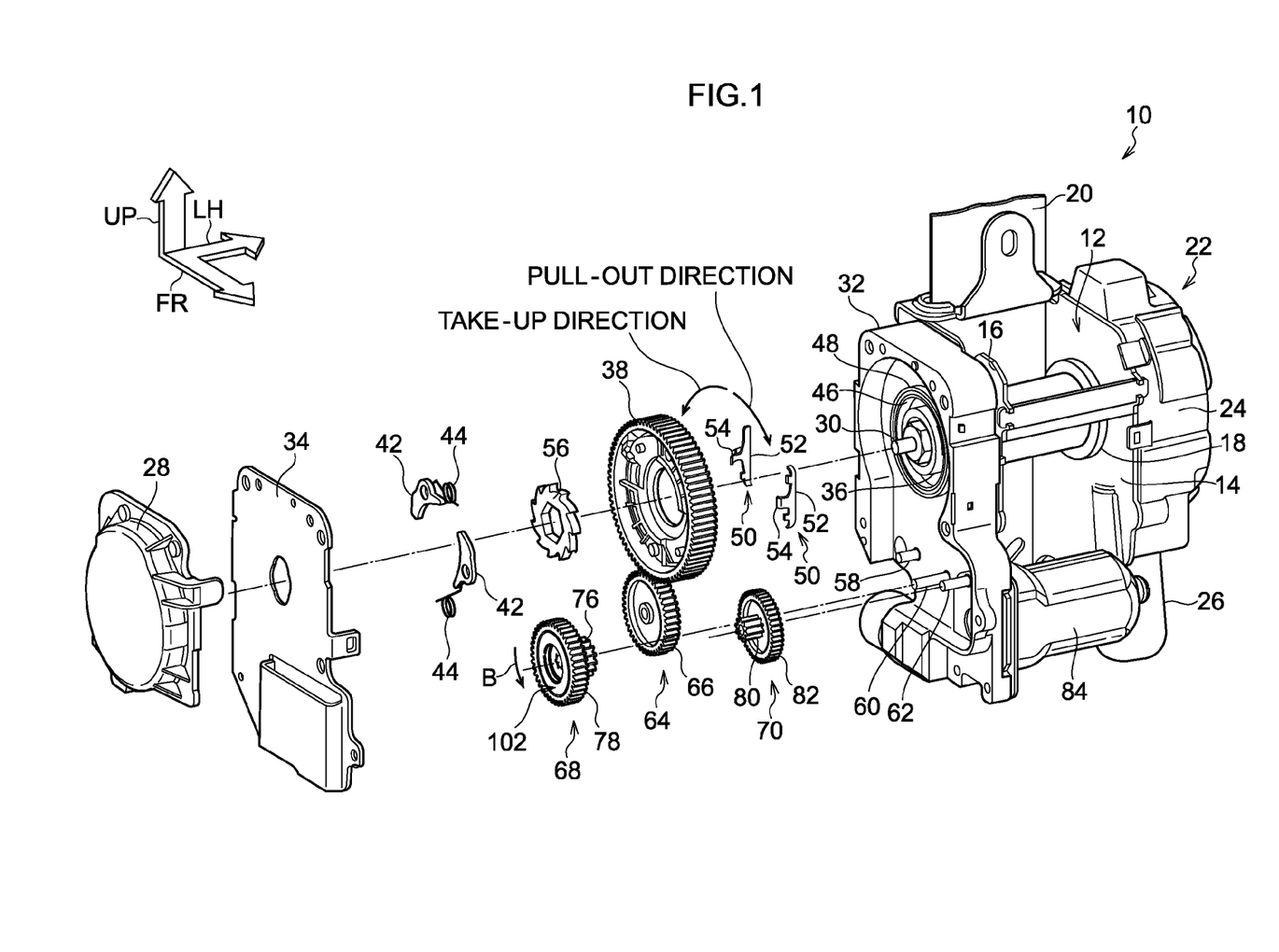
FIG. 1 is an exploded perspective view illustrating a webbing take-up device according to an exemplary embodiment.

As shown in FIG. 1, the webbing take-up device 10 relating to the exemplary embodiment is, for example, provided with a frame 12 fixed to a vehicle body configuration member, such as a vehicle framework member or reinforcement member. The frame 12 is provided with leg plates 14 and 16 facing each other in the left-right direction, and a spool 18 is provided between the leg plates 14 and 16. The spool 18 is formed in a substantially circular cylinder shape, with the axial direction running in the direction along which the leg plates 14 and 16 face each other. A base end side in a length direction of a webbing 20, worn by an occupant, is anchored (caught) to the spool 18. The spool 18 is capable of rotating about its center axial line in a take-up direction and a pull-out direction which is opposite to the take-up direction. The webbing 20 is taken up in a layered shape on an outer peripheral portion of the spool 18 by rotation of the spool 18 in the take-up direction.

A housing 24 for a lock mechanism 22 is attached to the leg plate 14. One end of the spool 18 is rotatably supported by the housing 24. Various components, configuring a VSIR mechanism and a WSIR mechanism, are provided inside the housing 24. The VSIR mechanism is actuated in a state of sudden vehicle deceleration in the event of a vehicle collision. The WSIR mechanism is actuated by pull-out direction rotation of the spool 18 accelerating in excess of a specific magnitude. Actuation of the VSIR mechanism or the WSIR mechanism actuates a lock member (not shown in the drawings) configuring the lock mechanism 22, preventing rotation of the spool 18 in the pull-out direction.

The spool 18 is further provided with a force limiter mechanism. In a state in which rotation of the spool 18 in the pull-out direction is prevented by the lock member of the lock mechanism, the spool 18 rotates in the pull-out direction while deforming an energy absorption member of the force limiter mechanism when the rotational force of the spool 18 in the pull-out direction exceeds a specific magnitude. The webbing 20 is pulled out from the spool 18 by the rotation amount of the spool 18 in the pull-out direction, and a portion of the rotational force of the spool 18 is expended and absorbed by the deformation of the energy absorption member. A pretensioner 26 is provided to a lateral side of the leg plate 14. The pretensioner 26 actuates in a vehicle emergency to forcibly rotate the spool 18 in the take-up direction.

A spring housing 28 is provided outside the leg plate 16. A leading end side of a shaft member 30 passes through the leg plate 16 and enters inside the spring housing 28, and the shaft member 30 is rotatably supported by the spring housing 28. The shaft member 30 is provided coaxially to the spool 18, and is coupled to the spool 18 to prevent relative rotation with respect to the spool 18. A spiral spring (not shown in the drawings) is provided inside the spring housing 28, and the shaft member 30 is urged in the take-up direction by the spiral spring. A gear housing 32 is provided between the leg plate 16 and the spring housing 28. The gear housing 32 is formed in a recessed shape open toward the right side, and the open side of the gear housing 32 is closed off by a plate 34 provided between the spring housing 28 and the gear housing 32.

A ratchet wheel 56 is provided inside the gear housing 32. The ratchet wheel 56 is provided coaxially to the shaft member 30, and is prevented from rotating relative to the shaft member 30. A circular cylinder shaped support portion 36 is formed inside the gear housing 32. The support portion 36 is formed coaxially to the spool 18, and is penetrated by the shaft member 30. A clutch gear 38 is rotatably supported by the support portion 36. Pawls 42 are turnably provided inside the clutch gear 38. Return springs 44 are also provided inside the clutch gear 38, urging the pawls 42 such that leading end sides of the pawls 42 turn toward the radial direction outside of the clutch gear 38.

Retaining rings 46 and 48 are formed at the outside of the support portion 36. The retaining rings 46 and 48 are formed coaxially to the support portion 36, and the retaining ring 48 is formed at the outside of the retaining ring 46. Base portions 52 of abut members 50 intrude between the retaining rings 46 and 48. The base portion 52 of each abut member 50 makes sliding contact with an outside face of the retaining ring 46 and an inside face of the retaining ring 48, and the abut members 50 are capable of rotating about the support portion 36 guided by the retaining rings 46 and 48.

An abut portion 54 extends from the base portion 52 of each abut member 50 toward the right side, and the abut portion 54 faces the leading end side of the pawl 42 on the side further toward the take-up direction side from the pawl 42. When the clutch gear 38 rotates in the take-up direction, the leading end side of the pawl 42 comes into contact (abuts) with the abut portion 54 of the abut member 50. When the clutch gear 38 rotates in the take-up direction in this state, the pawl 42 is turned against the urging force of the return spring 44, such that the leading end side of the pawl 42 enmeshes with the ratchet wheel 56. When the clutch gear 38 rotates further in the take-up direction in this state, the abut member 50 is pressed by the pawl 42, and the abut member 50 rotates about the support portion 36 together with the clutch gear 38.

Three shafts 58, 60, 62 are formed to the gear housing 32, and a gear 66, a two-step (two-stage) gear 68, and a two-step (two-stage) gear 70 configuring a reduction gear train 64 are rotatably supported on the shafts 58 to 62. The gear 66 enmeshes with the clutch gear 38 and a small gear portion 76 of the two-step gear 68, and a large gear portion 78 of the two-step gear 68 enmeshes with a small gear portion 80 of the two-step gear 70.

A motor 84 is provided at a lower side of the spool 18 between the leg plates 14 and 16. The motor 84 is electrically connected to an ECU (not shown in the drawings) serving as a control unit, and is further electrically connected to a vehicle-mounted battery (not shown in the drawings) through the ECU. The ECU is electrically connected to a forward observation device (not shown in the drawings) that measures a distance from the vehicle installed with the webbing take-up device 10 to another vehicle and/or obstacle located ahead from the vehicle. The ECU drives the motor 84 with forward rotation when the distance is below a specific value.

An output shaft (not shown in the drawings) of the motor 84 passes through the leg plate 16 and the gear housing 32, and a leading end of the output shaft of the motor 84 is provided with a pinion gear (not shown in the drawings) that enmeshes with the a large gear portion 82 of the two-step gear 70. The pinion gear of the output shaft of the motor 84, the two-step gear 70, the two-step gear 68, the gear 66, and the clutch gear 38 configure a rotation transmission route from the motor 84 to the spool 18, and forward rotation drive force of the motor 84 is reduced in speed by the reduction gear train 64 and transmitted to the clutch gear 38, thereby rotating the clutch gear 38 in the take-up direction.

Overload Release Mechanism Configuration

Figure 2A:
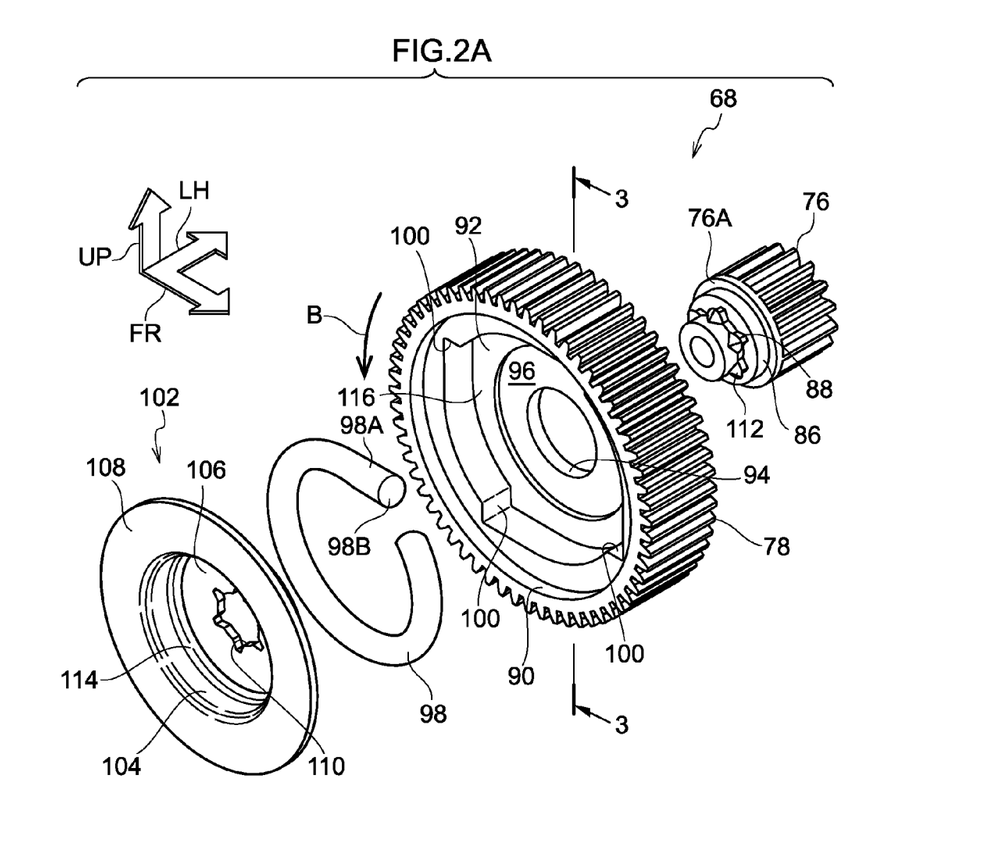
FIG. 2A is an exploded perspective view illustrating a first gear, a second gear, a rotor, and a clutch member.

The two-step gear 68 of the reduction gear train 64 configures an overload release mechanism. As illustrated in FIG. 2, a shaft portion 86 is formed on the right side of the small gear portion 76, serving as a second gear of the two-speed gear 68. The shaft portion 86 is formed coaxially to the small gear portion 76, with a smaller external profile than the small gear portion 76. A small gear portion end face 76A of the small gear portion 76 is therefore exposed around the shaft portion 86 at the lateral side (the outer side) in the radial direction of the shaft portion 86. A rotation stopper 88 is formed on the right side of the shaft portion 86. The external profile of the rotation stopper 88 is smaller than that of the shaft portion 86 and is formed in a non-circular shape such as a spline shape. A shaft portion end face 86A of the shaft portion 86 is therefore exposed around the rotation stopper 88 at the lateral side (the outer side) in the radial direction of the rotation stopper 88. The small gear portion 76, the shaft portion 86, and the rotation stopper 88 thus form a stepped shape, with an external profile becoming smaller on progression toward the rotation stopper 88 side.

The large gear portion 78, serving as a first gear of the two-step gear 68, is formed at the outer periphery of a tube shaped portion 90. A circular plate shaped intermediate bottom portion 92 is formed at an intermediate portion in an axial direction of the large gear portion 78, and a circular hole 94 is formed at an axial center portion of the intermediate bottom portion 92. The shaft portion 86 of the small gear portion 76 passes through the circular hole 94, and the intermediate bottom portion 92 abuts the small gear portion end face 76A, such that the large gear portion 78 is supported capable of relative rotation with respect to the small gear portion 76.

A recess shaped accommodation portion 96 is formed at the right side of the intermediate bottom portion 92. A clutch spring 98, serving as a clutch member, is provided inside the accommodation portion 96. The clutch spring 98 is formed by bending an (central) axial line of a metal bar (rod) material which has a circular cross-section profile into a circular shape, to form a substantially C-shape whose circumference length from circumference one end to circumference another end is shorter than a full circumference length around the circumferential direction and in which between the circumference one end and the circumference another end are non-continuous.

One end side of the clutch spring 98 configures a straight portion 98A extending in a straight line shape in a direction tangential to the circular shaped axial line of the clutch spring 98. Opposing (facing) portions 100 are formed to the accommodation portion 96 corresponding to one end face 98B of the straight portion 98A of the clutch spring 98. The opposing portions 100 are formed every specific angle (90 degrees in the present exemplary embodiment) about the axial center of the large gear portion 78. In an accommodated state of the clutch spring 98 in the accommodation portion 96, one of the opposing portions 100 is capable of abutting the one end face 98B of the clutch spring 98.

Figure 2B:
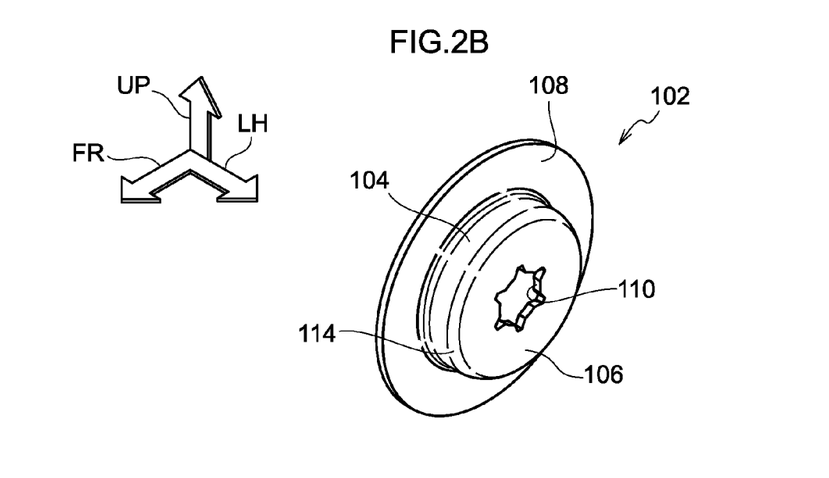
FIG. 2B is a perspective view illustrating the rotor from the opposite side to FIG. 2A.

The two-step gear 68 is provided with a rotor 102. The rotor 102 is provided with a circular cylinder portion 104. A left side end portion of the circular cylinder portion 104 is closed off by a bottom portion 106, and a flange 108 extends out from a right side end portion of the circular cylinder portion 104 toward the radial direction outside of the rotor 102. The overall rotor 102 is thus formed with a hat profile that is an example or an aspect of a bottomed circular cylinder shape as a whole, and is formed by press forming a flat metal plate. A hole 110 is formed in the bottom portion 106 of the rotor 102. The shape of the hole 110 is formed with the same shape as that of the rotation stopper 88 of the small gear portion 76. The rotation stopper 88 passes through the hole 110, thereby preventing rotation of the rotor 102 relative to the small gear portion 76.

Figure 3:
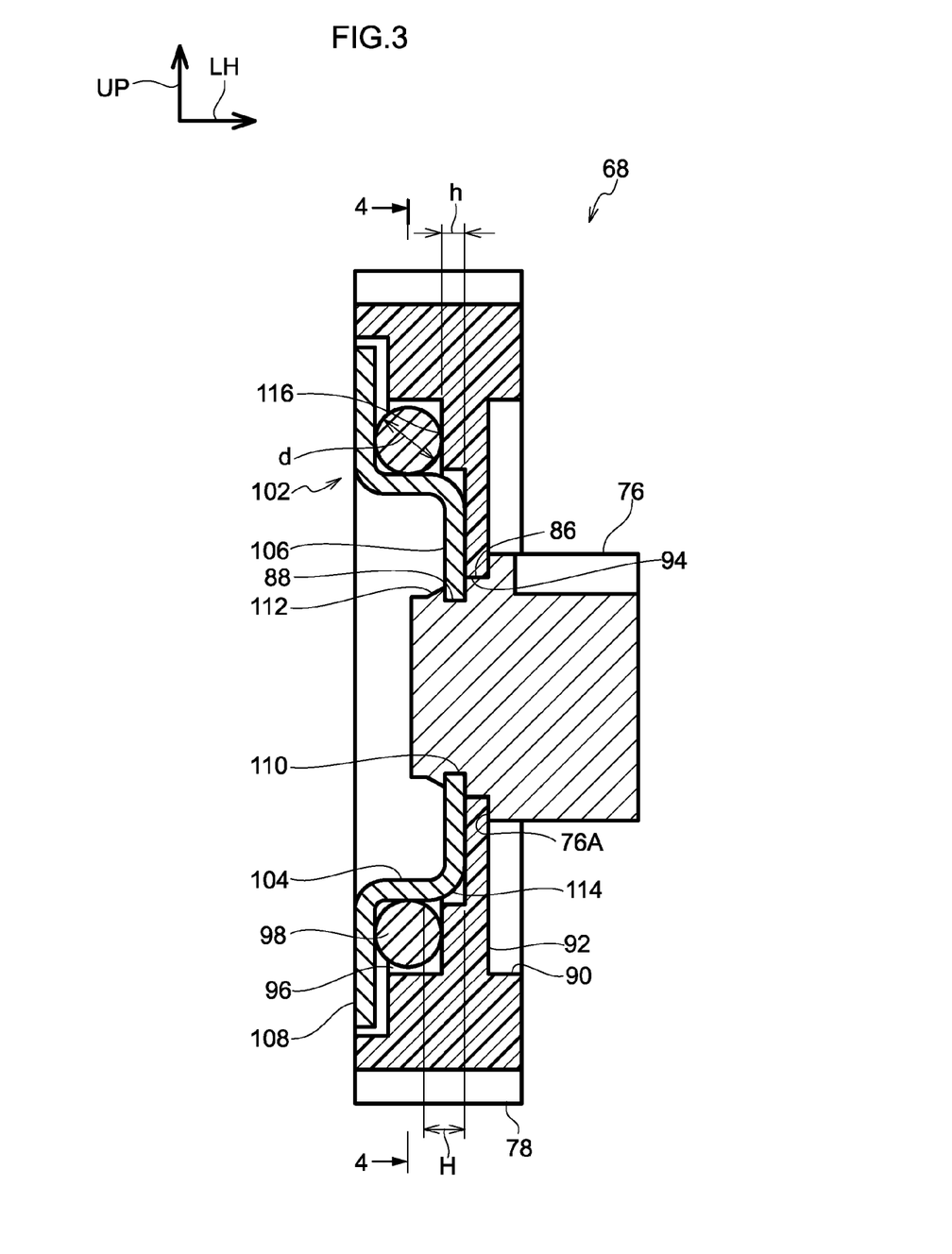
FIG. 3 is a cross-section taken along line 3-3 in FIG. 2A, and illustrates the first gear and related components assembled thereto.

In an abut state between the bottom portion 106 of the rotor 102 and the shaft portion end face 86A of the shaft portion 86, the leading end side of the rotation stopper 88 passes through the hole 110 and projects out toward the right side of the bottom portion 106. As shown in FIG. 3, the leading end side of the rotation stopper 88 is formed with a caulk portion 112. The caulk portion 112 is formed by pressing and caulking the rotation stopper 88 from the leading end. The external profile of the caulk portion 112 is larger than that of the hole 110, thereby preventing movement of the rotor 102 toward the right side. In this state, the intermediate bottom portion 92 of the large gear portion 78 is interposed (sandwiched) between the bottom portion 106 of the rotor 102 and the small gear portion 76, thereby restricting movement of the large gear portion 78 along the axial direction of the two-step gear 68 with respect to the small gear portion 76.

More specifically, an axial direction dimension of the shaft portion 86 between the small gear portion end face 76A of the small gear portion 76 and the shaft portion end face 86A of the shaft portion 86 is set substantially same as (the same as, or slightly larger than) the thickness (wall thickness) of the intermediate bottom portion 92 of the large gear portion 78. The intermediate bottom portion 92 is therefore not strongly pressed to the bottom portion 106 of the rotor 102 or the small gear portion end face 76A of the small gear portion 76, even when the intermediate bottom portion 92 being interposed between the bottom portion 106 and the small gear portion end face 76A. This enables free relative rotation of the large gear portion 78 between the small gear portion 76 and the rotor 102. In this state, the accommodation portion 96 of the large gear portion 78, in which the clutch spring 98 is provided, is closed off by the flange 108 of the rotor 102.

The clutch spring 98 is attached to the circular cylinder portion 104 of the rotor 102 so as to be wound thereon countering against the elasticity, the clutch spring 98 pressing and contacting on the outside face of the circular cylinder portion 104. The clutch spring 98 and the rotor 102 rotate together integrally (as a unit) due to friction between the clutch spring 98 and the circular cylinder portion 104.

Figure 4:
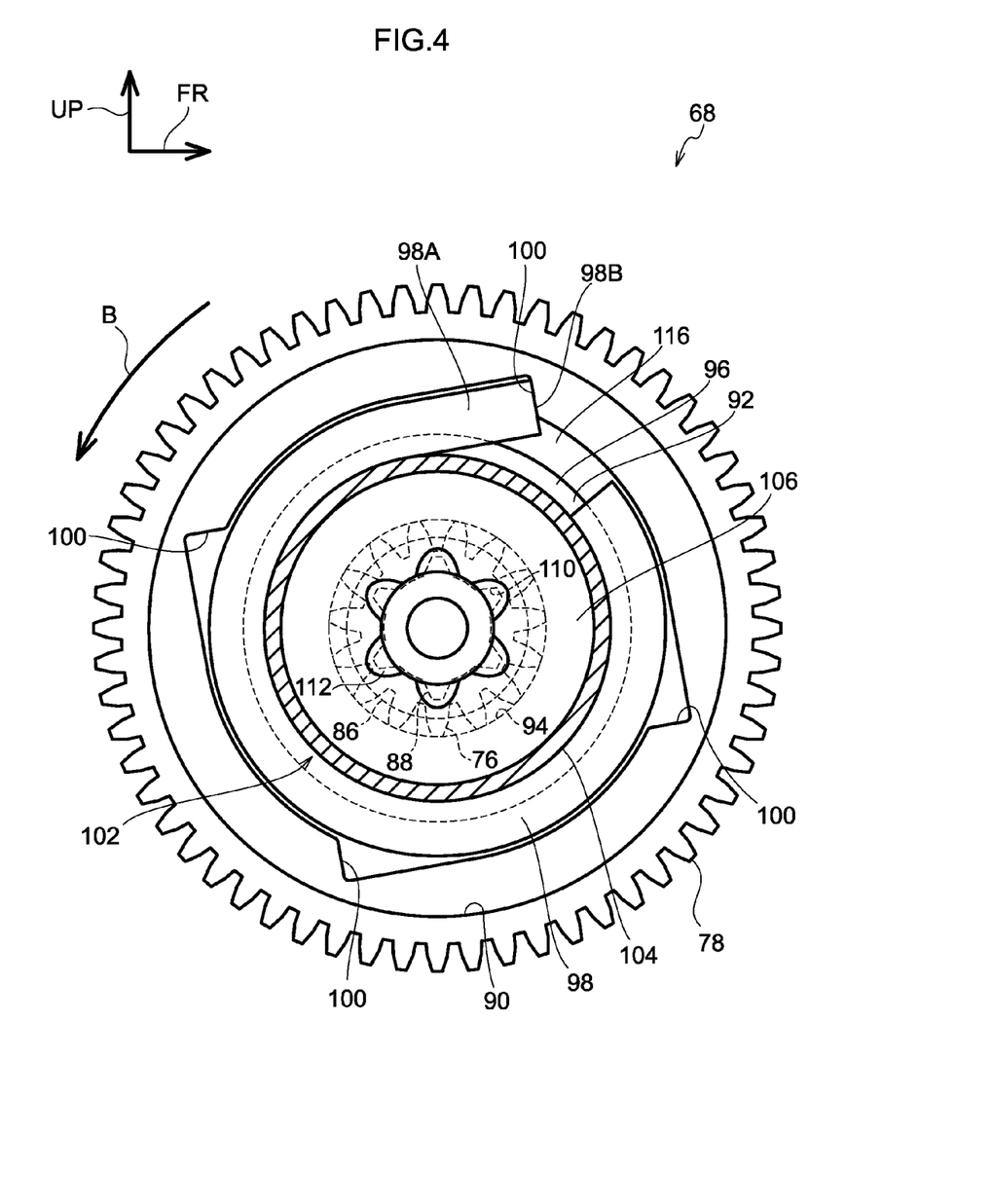
FIG. 4 is a cross-section taken along line 4-4 in FIG. 3.

A corner portion 114 is formed at the left side end portion of the circular cylinder portion 104. The rotor 102 is formed by pressing, thus forming the corner portion 114 between the circular cylinder portion 104 and the bottom portion 106 so as to connect the circular cylinder portion 104 and the bottom portion 106. The corner portion 114 is curved such that the external diameter dimension gradually decreases toward the bottom portion 106 side. As illustrated in FIG. 2 and FIG. 4, at the intermediate bottom portion 92 of the large gear portion 78, a movement prevention portion 116 serving as a restriction section is formed, and due thereto, a step portion is formed at the intermediate bottom portion 92. The movement prevention portion 116 is formed inside the accommodation portion 96 and formed at the radial direction outside of the circular cylinder portion 104 of the rotor 102. The movement prevention portion 116 is formed such that a length (height) "h" which is a step difference between the intermediate bottom portion 92 and the movement prevention portion 116, namely, which is a length, in the axial direction of the large gear portion 78 (namely, in the axial direction of the small gear portion 76), of the movement prevention portion 116, a wire diameter (diameter of the outer circumference) "d" of the clutch spring 98, and a length "H" from an outside face of the bottom portion 106 of the rotor 102 (a face of the intermediate bottom portion 92 of the large gear portion 78, at the bottom portion 106 side) to a boundary between the corner portion 114 and the circular cylinder portion 104, satisfy the relationship in Equation (1) below.

$$H \le (d/2) + h \qquad \text{Equation (1)}$$

Due thereto, in an abut (contact) state between the clutch spring 98 and the movement prevention portion 116, the clutch spring 98 abuts the rotor 102 at a position further to the right side (the circular cylinder portion 104 side, namely, a side opposite to the bottom portion 106 side) than the boundary between the corner portion 114 and the circular cylinder portion 104, which boundary is the maximum external diameter position of the corner portion 114.

Operation and Advantageous Effects of the Present Exemplary Embodiment

Explanation follows regarding operation and advantageous effects of the present exemplary embodiment.

In the webbing take-up device 10, the distance from the vehicle installed with the webbing take-up device 10 to another vehicle and/or obstacle located ahead from the vehicle is measured by the forward observation device, and when the distance is below the specific value, the ECU drives the motor 84 for forward rotation. The forward rotation drive force of the motor 84 is transmitted to the large gear portion 78 of the two-step gear 68 through the pinion gear of the output shaft of the motor 84 and the two-step gear 70. The large gear portion 78 accordingly rotates in the direction of arrow B in FIG. 4. When, due to the rotation of the large gear portion 78, the one end face 98B of the clutch spring 98 is pressed by one opposing portion 100 of the large gear portion 78, the rotor 102 rotates together with the clutch spring 98. Due thereto, when the small gear portion 76 of the two-step gear 68 is rotated, the rotation of the small gear portion 76 is transmitted through the gear 66 to the clutch gear 38, and the clutch gear 38 rotates in the take-up direction.

Due thereto, when the pawls 42 of the clutch gear 38 abut the abut portions 54 of the abut members 50, the pawl 42 turns due to a pressing reaction force from the abut portion 54, and the leading end side of the pawl 42 enmeshes with the ratchet wheel 56. Due thereto, the rotation of the clutch gear 38 is transmitted through the ratchet wheel 56 and the shaft member 30 to the spool 18, and the spool 18 is rotated in the take-up direction. The webbing 20 mounted over the body of the occupant is thereby taken up onto the spool 18, removing slackness of the webbing 20.

When, for example, the vehicle slows down (decelerates), the body of the occupant attempts to moves toward the vehicle front side under inertia, and the webbing 20 is pulled by the body of the occupant. If the motor 84 is being driven for forward rotation in this state, rotation force which is in the opposite direction to the drive force of the motor 84 is transmitted from the spool 18 toward the motor 84 side. Due thereto, when a pressing force applied from the one end face 98B of the clutch spring 98 to the opposing portion 100 formed at the large gear portion 78 of the two-step gear 68 exceeds a sliding (slipping) torque (maximum frictional force) between the clutch spring 98 and the circular cylinder portion 104 of the rotor 102, the diameter of the clutch spring 98 is caused to be enlarged so the clutch spring 98 slides (slips) against the circular cylinder portion 104 of the rotor 102. This enables a reduction in the load applied to the respective enmeshing portions of the clutch gear 38, the respective gears 66, 68, 80 of the reduction gear train 64, and the pinion gear of the output shaft of the motor 84.

The clutch spring 98 attached to the rotor 102 abuts the movement prevention portion 116 of the large gear portion 78, thereby preventing any more movement of the clutch spring 98 further toward the intermediate bottom portion 92 side. This thereby enables movement of the clutch spring 98 in the axial direction of the rotor 102 to be restricted.

The length "h" of the movement prevention portion 116, the wire diameter d of the clutch spring 98, and the length H from the outside face of the bottom portion 106 of the rotor 102 to the boundary between the corner portion 114 and the circular cylinder portion 104, satisfy the relationship in Equation (1) below.

$$H \le (d/2) + h \qquad \text{Equation (1)}$$

The clutch spring 98 is accordingly wound securely onto the circular cylinder portion 104, and the winding position of the clutch spring 98 on the rotor 102 is not at the corner portion 114.

The corner portion 114 is curved such that the external diameter dimension gradually decreases on progression toward the intermediate bottom portion 92 side of the large gear portion 78. Accordingly, in a case in which the winding position of the clutch spring 98 reaches the corner portion 114 due to movement of the clutch spring 98 toward the intermediate bottom portion 92 side, the clutch spring 98 would attempt to move further toward the intermediate bottom portion 92 side while reducing the dimension of the clutch spring 98 in the radial direction of the rotor 102 due to the resilience of the clutch spring 98. Due thereto, the corner portion 114 of the rotor 102 would be pushed toward the opposite side to the intermediate bottom portion 92 by the clutch spring 98.

Note that in the present exemplary embodiment, in a state in which movement of the clutch spring 98 along the axial direction of the large gear portion 78 toward the intermediate bottom portion 92 side (namely, movement toward the first gear side) is prevented by the movement prevention portion 116, the winding position of the clutch spring 98 is on the circular cylinder portion 104, and the winding position of the clutch spring 98 does not reach the corner portion 114. Accordingly, the clutch spring 98 does not push the corner portion 114 of the rotor 102 toward the opposite side to the intermediate bottom portion 92 of the large gear portion 78.

Setting a large length "h" of the movement prevention portion 116 enables the winding position of the clutch spring 98 to be maintained at the circular cylinder portion 104, even with a small wire diameter "d" of the clutch spring 98. Enabling a small wire diameter "d" of the clutch spring 98 in this manner accordingly enables a larger tightening margin (allowance) of the clutch spring 98 around the circular cylinder portion 104 of the rotor 102. This enables a reduction in variation of the slipping (sliding) torque, circumferential direction slipping occurring between the clutch spring 98 and the circular cylinder portion 104 of the rotor 102.

The movement prevention portion 116 is integrally formed to the large gear portion 78, and so provision of the movement prevention portion 116 does not increase the number of components. The center axial direction dimension of the circular cylinder portion 104 of the rotor 102 can also be reduced due to enabling a small wire diameter for the clutch spring 98. A thinner two-step gear 68 is accordingly enabled.

Note that in the present exemplary embodiment, the movement prevention portion 116 is formed continuously around the axis of the large gear portion 78; however configuration may be made in which plural movement prevention portions are formed intermittently around the axis of the large gear portion 78. In such a configuration, there is no particular limitation to the number of movement prevention portions as long as there are more than one; however setting the number of movement prevention portions to three or more stabilizes the clutch spring 98 in an abut state between the clutch spring 98 and the movement prevention portions.

In the above exemplary embodiment, the length "h" of the movement prevention portion 116 is set so as to satisfy Equation (1). However, the configuration does not have to satisfy Equation (1). For example, when the rotor 102 is formed by press-forming, sometimes the corner portion 114 is formed bulging out toward the radial direction outside of the rotor 102 at an intermediate portion of the corner portion 114 in the axial direction of the rotor 102. In such a configuration, the position of the maximum external diameter of the corner portion 114 is the position where it bulges out toward the radial direction outside of the rotor 102. Accordingly, in an abut state between the movement prevention portion 116 and the clutch spring 98, it is sufficient that by the movement prevention portion 116, the winding position of the clutch spring 98 can be prevented from moving further toward the intermediate bottom portion 92 side of the large gear portion 78 than the bulging position. Namely, in an abut state between the movement prevention portion 116 and the clutch spring 98, it is sufficient that the clutch spring 98 is wound onto the rotor 102 at a position further toward the circular cylinder portion 104 side than such a position where the external diameter of the corner portion 114 is maximum. In such a configuration, Equation (1) is not always satisfied.

In the above exemplary embodiment, the movement prevention portion 116 is formed to the large gear portion 78. However, the movement prevention portion may be formed as a separate body to the large gear portion 78, configured for example by a thin plate shaped ring, and the movement prevention portion may be disposed on the accommodation portion 96 side of the intermediate bottom portion 92 of the large gear portion 78. Moreover, plural ring shaped movement prevention portions may be stacked in the axial direction of the large gear portion 78. Configuring the movement prevention portion as a separate body to the large gear portion 78 in this manner enables such that, even if change of the wire diameter "d" of the clutch spring 98, it can be simply handled by providing to the large gear portion 78 a movement prevention portion(s) having a thickness adjusted for the changes (larger or smaller) in the wire diameter "d", enabling common application of the large gear portion 78 and the rotor 102.

Note that in the present exemplary embodiment, in the two-step gear 68, the large gear portion 78 that is input with drive force from the motor 84 configures the first gear, and the small gear portion 76 that outputs rotation force to the spool 18 side configures the second gear. However, configuration may be made in which the second gear is input with drive force from the motor, and the first gear outputs rotation force to the spool.

In the present exemplary embodiment, the large gear portion 78 configuring the first gear is configured larger and with more teeth than the small gear portion 76 configuring the second gear. However, the second gear may be configured larger and with more teeth than the first gear, and there is no limitation to the sizes or numbers of teeth of the first gear and the second gear.

What is claimed is:

1. A webbing take-up device comprising:
   a spool on which webbing is taken up;
   a motor that rotates the spool;
   a first gear that is provided on a rotation transmission route from the motor to the spool;
   a second gear that is provided on the rotation transmission route and that is capable of relative rotation with respect to the first gear;
   a clutch member that is provided at the first gear and transmits rotation between the second gear and the first gear, and that cuts off the rotation transmission by the clutch member rotating relative to the second gear;
   a restriction section that is provided between the first gear and the clutch member in an axial direction of the second gear, and that restricts movement of the clutch member toward the first gear side, and
   a rotor including:
   a circular cylinder portion that is formed in a circular cylinder shape; and
   a corner portion that is formed at an end portion of the circular cylinder portion at a side of the first gear, the corner portion having a tapered shape such that, as seen along the axial direction of the second gear, a diameter of the corner portion is reduced compared to a diameter of the circular cylinder portion,
   wherein, due to the restriction section, the clutch member is wound onto the rotor at a position further toward a side of the circular cylinder portion in the axial direction than a position of the corner portion, which position is an outer most position in a radial direction of the circular portion, and
   the rotor is fixed to the second gear, and
   wherein the restriction section is integrally formed at the first gear.

2. The webbing take-up device of claim 1, wherein:
   a cross-section, in a direction orthogonal to a circumferential direction of the rotor, of the clutch member has a circular profile, and a sum of a length of the restriction section in the axial direction of the second gear and a radius of the cross-section of the clutch member is set to be equal to or greater than a length from an end portion of the corner portion at a side of the circular cylinder portion to the first gear.

3. The webbing take-up device of claim 1, further comprising a rotor including:
   a circular cylinder portion that is formed in a circular cylinder shape;
   a bottom portion that is formed at an end portion of the circular cylinder portion at a side of the first gear; and
   a corner portion that is formed between the circular cylinder portion and the bottom portion to connect the circular cylinder portion and the bottom portion,
   wherein: due to the restriction section, the clutch member is wound onto the rotor at a position further toward a side of the circular cylinder portion in the axial direction than a position of the corner portion, which position is an outermost position in a radial direction of the circular cylinder portion, and the rotor is fixed to the second gear.

4. The webbing take-up device of claim 1, wherein in a state in which the restriction section and the clutch member are abutted, the clutch member is wound onto the rotor at the position further toward the side of the circular cylinder portion than the position where the external diameter of the corner portion is maximum.

5. A webbing take-up device comprising:
a spool on which webbing is taken up;
a motor that rotates the spool;
a first gear that is provided on a rotation transmission route from the motor to the spool;
a second gear that is provided on the rotation transmission route and that is capable of relative rotation with respect to the first gear;
a clutch member that is provided at the first gear and transmits rotation between the second gear and the first gear, and that cuts off the rotation transmission by the clutch member rotating relative to the second gear;
a restriction section that is provided between the first gear and the clutch member in an axial direction of the second gear, and that restricts movement of the clutch member toward the first gear side, and
a rotor including:
a circular cylinder portion that is formed in a circular cylinder shape;
a bottom portion that is formed at an end portion of the circular cylinder portion at a side of the first gear; and
a corner portion that is formed between the circular cylinder portion and the bottom portion, the corner portion connecting the circular cylinder portion and the bottom portion at an end portion of the circular cylinder portion at a side of the first gear, the corner portion having a tapered shape such that, as seen along the axial direction of the second gear, a diameter of the corner portion is reduced compared to a diameter of the circular cylinder portion,
wherein, due to the restriction section, the clutch member is wound onto the rotor at a position further toward a side of the circular cylinder portion in the axial direction than a position of the corner portion, which position is an outer most position in a radial direction of the circular portion, and
the rotor is fixed to the second gear, and
wherein the restriction section is integrally formed at the first gear.

6. The webbing take-up device of claim 5, wherein in a state in which the restriction section and the clutch member are abutted, the clutch member is wound onto the rotor at the position further toward the side of the circular cylinder portion than the position where the external diameter of the corner portion is maximum.

7. The webbing take-up device of claim 5, wherein the first gear includes a bottom section which is arranged to face the bottom portion of the rotor in the axial direction,
the restriction section is configured such that a location which faces the clutch member in the axial direction of the bottom section protrudes further toward a side of the clutch member in the axial direction than another location of the bottom section, and
the restriction section restricts movement of the clutch member toward the first gear side by an end portion of the restriction section at the side of the clutch member in the axial direction abutting the clutch member in the axial direction.

8. A webbing take-up device comprising:
a spool on which webbing is taken up;
a motor that rotates the spool;
a first gear that is provided on a rotation transmission route from the motor to the spool;
a second gear that is provided on the rotation transmission route and that is capable of relative rotation with respect to the first gear;
a clutch member that is provided at the first gear and transmits rotation between the second gear and the first gear, and that cuts off the rotation transmission by the clutch member rotating relative to the second gear;
a restriction section that is provided between the first gear and the clutch member in an axial direction of the second gear, and that restricts movement of the clutch member toward the first gear side, and
a rotor including:
a circular cylinder portion that is formed in a circular cylinder shape;
a bottom portion that is formed at an end portion of the circular cylinder portion at a side of the first gear; and
a corner portion that is formed between the circular cylinder portion and the bottom portion to connect the circular cylinder portion and the bottom portion,
wherein, due to the restriction section, the clutch member is wound onto the rotor at a position further toward a side of the circular cylinder portion in the axial direction than a position of the corner portion, which position is an outermost position in a radial direction of the circular cylinder portion, and the rotor is fixed to the second gear, and
wherein the first gear includes a bottom section which is arranged to face the bottom portion of the rotor in the axial direction, the restriction section is configured such that a location which faces the clutch member in the axial direction of the bottom section protrudes further toward a side of the clutch member in the axial direction than another location of the bottom section, and the restriction section restricts movement of the clutch member toward the first gear side by an end portion of the restriction section at the side of the clutch member in the axial direction abutting the clutch member in the axial direction.

* * * * *